July 29, 1947.   M. J. UDY   2,424,866
PROCESS FOR THE TREATMENT OF MATTE TO RECOVER METALLIC SALTS
Filed April 15, 1942
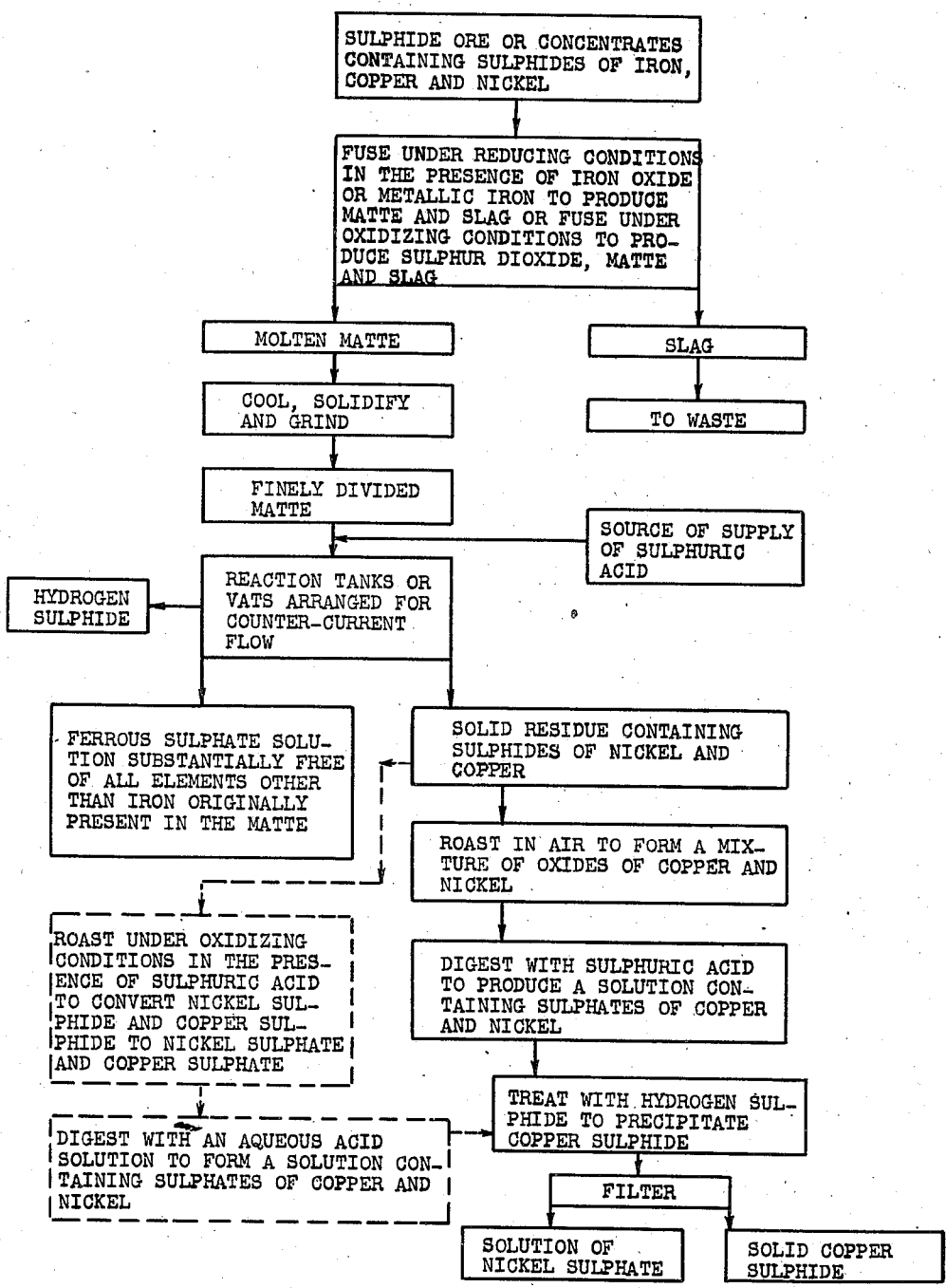
INVENTOR.
MARVIN J. UDY
BY
ATTORNEYS Patented July 29, 1947

2,424,866

UNITED STATES PATENT OFFICE 2,424,866

PROCESS FOR THE TREATMENT OF MATTE TO RECOVER METALLIC SALTS

Marvin J. Udy, Niagara Falls, N. Y.

Application April 15, 1942, Serial No. 439,097

19 Claims. (Cl. 75—21)

This invention relates to metallurgy and has for an object the provision of an improved metallurgical method or process. More particularly, the invention contemplates the provision of an improved method or process for separating iron contained in iron sulphide-bearing material from other elements contained in the iron sulphide-bearing material with the production of (1) an aqueous solution containing the iron of the iron sulphide-bearing material and substantially free of other elements contained in the material, (2) a gaseous hydrogen sulphide containing sulphur originally combined with iron in the iron sulphide-bearing material and (3) a solid product containing substantially all other elements contained in the iron sulphide-bearing material and from which the other elements may be separated and recovered readily. The invention further contemplates the provision of an improved method or process for recovering nickel from nickel sulphide-bearing materials in which the nickel sulphide is associated with iron sulphide. A further object of the invention is to provide an improved method or process for recovering separate nickel-bearing products and copper-bearing products from iron sulphide-bearing materials containing nickel and copper in the form of sulphides. Another object of the invention is to provide an improved method or process for recovering separate cobalt and copper products from iron sulphide-bearing material which contains cobalt or copper; cobalt and copper; cobalt and nickel; copper and nickel; or cobalt, copper and nickel.

The present invention is based on my discovery that the iron contained in the iron sulphide-bearing material may be separated effectively from other elements contained in the iron sulphide-bearing material by treatment of the material with a mineral acid. Thus, for example, I have found that a matte product containing sulphur, iron, copper, nickel, cobalt and such other elements as arsenic, antimony, tin, molybdenum, selenium, tellurium, vanadium and precious metals can be digested with an aqueous solution of sulphuric acid to produce (1) an aqueous solution of ferrous sulphate substantially free of all other elements contained in the iron sulphide-bearing material, (2) gaseous hydrogen sulphide containing the sulphur combined with iron in the iron sulphide-bearing material and (3) a solid product containing substantially all of the balance of the sulphur of the iron sulphide-bearing material and substantially all other elements contained in the iron sulphide-bearing material. The invention may be employed advantageously in the treatment of iron sulphide-bearing materials containing the elements, nickel, cobalt and copper to form solid products containing one or more of those elements in concentrated forms and substantially free of iron. I have found that nickel sulphide is insoluble or substantially insoluble in (1) neutral solutions of ferrous sulphate, (2) solutions containing free acid which are saturated with respect to ferrous sulphate and (3) neutral and acid solutions of ferrous sulphate which are saturated with hydrogen sulphide. I have found, also, that treatment of a nickel-bearing matte with an aqueous solution of sulphuric acid capable of dissolving nickel sulphide can be so conducted as to produce gaseous hydrogen sulphide, an aqueous solution of ferrous sulphate free of nickel and solid nickel sulphide. In the environment created by the acid treatment, the production of a soluble nickel compound is inhibited. It appears that solution of the nickel sulphide of the matte is prevented in part and that any soluble nickel sulphate which might be formed is converted to insoluble nickel sulphide by hydrogen sulphide generated. It appears, also, that generation of hydrogen sulphide in the liquid during the course of the acid treatment insures the maintenance of a condition of saturation such that any nickel sulphide converted to soluble nickel sulphate is effectively re-formed as nickel sulphide. Probably, the insolubility of any nickel sulphide re-formed during the course of the treatment is attributable in some measure at least to a change in the character of the nickel sulphide which occurs after formation. Cobalt acts similarly to nickel in the treatment of iron sulphide-bearing material containing cobalt.

According to the present invention, ore containing sulphides of the metals, iron and nickel; iron and copper; iron and cobalt; iron, cobalt and copper; iron, cobalt and nickel; iron, nickel and cobalt; iron, copper, cobalt and nickel; or iron, nickel and copper, is smelted with suitable fluxing material to produce a matte containing sulphides of the metals which is soluble in a mineral acid such as sulphuric acid and a separable slag containing the gangue materials of the ore. The matte and slag products are separated, and the matte subsequently is digested with acid to effect the separation of iron from other metals contained therein. Treatment of the matte with an aqueous solution of an acid such as sulphuric acid results in the production of gaseous hydrogen sulphide, an aqueous solution of ferrous sulphate and a solid product comprising one or more sulphides of the metals nickel, cobalt and copper together with any precious metals which may be present in the ore. The slag may be wasted or disposed of in any other suitable manner.

In practicing the invention, iron sulphide-bearing ore preferably is smelted under such conditions as to produce matte in which the proportion of sulphur to metal does not exceed one atom of sulphur for each atom of metal. For example, a pyritic ore containing iron pyrite ($FeS_2$), nickel sulphide (NiS) and copper sulphide (CuS or $Cu_2S$) preferably is smelted under conditions such that the amount and proportion of sulphur in the resulting matte does not exceed one atom of sulphur for each atom of iron (Fe), nickel (Ni) and copper (Cu) contained therein. The smelting of a pyritic ore preferably is so conducted that the matte product formed contains iron in the form of ferrous sulphide or in the form of ferrous sulphide and in a lower state of oxidation, all iron pyrite being decomposed.

Smelting may be carried out in any suitable type of furnace, and adjustment of the proportions of sulphur may be carried out in any suitable manner, as, for example, (1) by smelting the ore under oxidizing conditions to oxidize excess sulphur, (2) by smelting a charge comprising the ore, iron oxide and a reducing agent such as coke to reduce the iron oxide to metallic iron and effect chemical combination of the metallic iron with the excess sulphur, or (3) by smelting a charge of the ore in the presence of sufficient metallic iron to combine with the excess sulphur. Smelting of the ore may be carried out under conditions such as to produce a matte product containing free or elemental iron. The production or incorporation of free iron in the final matte product insures the establishment of the proper ratio of sulphur to metal in the matte product. Any suitable amount of metallic iron may be incorporated in the final matte product. Usually, an amount of metallic iron equal to a fraction of one per cent of the weight of the matte insures proper solubility of the matte product. Incorporation of substantially greater amounts may result in waste of acid in the subsequent acid treatment of the matte.

The matte may be subjected to the action of acid in any suitable physical condition and according to any suitable procedure. Preferably the molten matte produced by smelting sulphide ore is cooled and solidified, and the solidified matte is ground to form a finely divided matte product. The matte may be ground to form a product comprising particles of any suitable sizes. The time required for completion of the reaction between the acid and the matte depends to some extent upon the sizes of the matte particles, the reaction taking place more rapidly when smaller particles of matte are employed. Generally, reaction between the matte and acid proceeds rapidly to completion when a matte product consisting largely of particles small enough to pass a 100-mesh screen is employed.

Treatment of the matte with acid may be carried out according to any suitable procedure as, for example, in a batch-type operation or in a countercurrent-type operation, and an aqueous solution of acid of any suitable initial concentration or strength may be employed. Usually, I prefer to employ an aqueous solution of sulphuric acid containing sulphuric acid in such concentration that treatment of the matte with the acid results in consumption of all of the acid of the solution and the production of a neutral or substantially neutral solution of ferrous sulphate, but I may employ an aqueous solution of sulphuric acid containing sulphuric acid in such concentration that treatment of matte results in consumption of only a portion of the acid of the solution and the production of an aqueous solution of ferrous sulphate containing some free acid.

In treating matte with an aqueous solution of sulphuric acid, I prefer to employ a solution of such concentration and to so conduct the acid treatment that a substantially neutral (or acid-free) concentrated solution of ferrous sulphate is produced. Treatment of the matte with acid preferably is carried out at an elevated temperature above about 25° C., and the acid solution employed preferably is of such concentration that the resulting ferrous sulphate solution will be saturated when cooled to 25° C. An aqueous solution of sulphuric acid containing sulphuric acid ($H_2SO_4$) in amount equal to about fifteen to twenty percent of the weight of the solution may be employed advantageously in the treatment of matte containing nickel or cobalt or both at temperatures above 25° C. and below the boiling temperature of the liquid. In the treatment of matte containing nickel or cobalt or both, it is advisable to employ temperatures below the boiling tempertaures of the liquids in order to maintain the liquids saturated with respect to hydrogen sulphide. Boiling results in driving off the hydrogen sulphide rapidly, and, consequently, nickel and cobalt may be converted to soluble compounds. In the treatment of nickel and cobalt-free matte products such, for example, as matte products containing sulphides of iron and copper, boiling temperatures may be employed. The maximum strength or concentration of the acid solution employed will be determined to some extent by the permissible temperature of treatment, since the concentration of the ferrous sulphate solution produced depends upon the strength or concentration of the acid solution employed. In the treatment of matte products containing cobalt or nickel or both, I prefer to conduct the acid treatments at temperatures between about 50° C. and the boling temperatures of the liquids and to employ acid solutions of such concentrations as to produce concentrated ferrous sulphate solutions from which ferrous sulphate may be crystallized upon cooling to temperatures between the temperature of treatment and about 25° C. I may, however, employ relatively weak acid solutions and produce neutral or substantially neutral solutions of ferrous sulphate from which ferrous sulphate will not crystallize upon cooling to a temperature of 25° C. or lower.

I prefer to treat nickel-bearing matte with acid in a countercurrent system, employing a series of tanks or vats, introducing untreated matte into the first tank or vat of the series while introducing the initial aqueous solution of sulphuric acid into the last vat or tank of the series, effecting partial decomposition of the matte and partial consumption of the acid in each tank, passing residual solid material to each of the various vats or tanks in series from the first to the last and passing acid solution to each of the vats or tanks in series from the last to the first, withdrawing from the first vat or tank a substantially neutral concentrated solution of ferrous sulphate and withdrawing from the last tank or vat a substantially iron-free nickel sulphide-bearing product. I prefer to heat the liquid in the last tank or vat to a temperature of about 70° C. or higher. Heat developed as the result of the reactions maintains the temperature of the liquid in the first tank at about 50° C.

The solid nickel-bearing product obtained from the last tank or vat in the series will contain other metals such as copper, cobalt, silver, gold and platinum which may be present in the matte subjected to the acid treatment originally. Separation and recovery of the various metals which may be present in the nickel sulphide-bearing product may be carried out in any suitable manner.

In the treatment of an iron sulphide-bearing ore containing nickel and copper, the final solid residue resulting from an acid treatment of a matte obtained in smelting the ore may consist of sulphides of nickel and copper. The nickel and copper of such a product may be separated (1) by roasting the product in air to produce a mixture of oxides of copper and nickel, digesting the oxide product with an acid such as sulphuric acid to produce a solution containing sulphates of nickel and copper, and precipitating the copper from such a solution by means of hydrogen sulphide or (2) by roasting the product in air in the presence of sulphuric acid to convert the nickel sulphide and copper sulphide to nickel sulphate and copper sulphate, forming an aqueous solution containing the sulphates and precipitating the copper by treatment of the solution with hydrogen sulphide.

The method or process of the invention may be employed with advantage in the treatment of iron sulphide-bearing materials of all grades. It may be employed with particular advantage in the treatment of iron sulphide-bearing ores or other materials containing relatively small amounts of such valuable metals as copper, nickel and cobalt. Practically quantitative separation and recovery may be accomplished in treating ores containing as little as about two-tenths of one percent (0.2%) of any of such metals. Ferrous sulphate and hydrogen sulphide are produced as substantially pure by-products.

The process of the invention may be employed advantageously to produce valuable compounds of metals such as copper, cobalt and nickel which are marketable as such or which may be employed in the production of those metals in elemental forms. Thus, for example, a copper-free solution of nickel sulphate produced in the process may be subjected to electrolysis to produce metallic nickel or evaporated to dryness to produce solid nickel sulphate which may be marketed as such or subjected to a decomposition treatment at an elevated temperature to produce solid nickel oxide for marketing or for subsequent reduction to metallic nickel. Copper sulphide produced in accordance with the invention may be subjected to an oxidizing treatment with air or other oxygen-containing gas at an elevated temperature to produce copper oxide or with air or other oxygen containing gas in the presence of sulphuric acid at an elevated temperature to produce copper sulphate. The copper oxide and the copper sulphate may be recovered and marketed as such or they may be utilized as sources of copper in electrolytic processes. Copper oxide and copper sulphate are desirable sources of copper for electrolytic processes, and copper oxide may be reduced directly to metallic copper by means of carbonaceous or non-carbonaceous reducing materials.

In the separation of nickel and copper by treatment of an aqueous solution of the sulphates with hydrogen sulphide, a solution having an acid reaction may be employed advantageously to prevent precipitation of nickel sulphide. An acid solution may be produced by employing an acid aqueous liquid in forming the solution.

The separation of cobalt from copper is similar to the separation of nickel from copper, and compounds of cobalt similar to compounds of nickel may be recovered and utilized.

The accompanying flow sheet illustrates two methods of the invention, one being shown completely in solid lines and the other being shown partly in solid lines and partly in broken lines.

I claim:

1. The method of treating matte containing sulphides of iron and nickel to produce separate iron-bearing and nickel-bearing products which comprises digesting the matte with an aqueous solution of sulphuric acid of such concentration as to be capable of forming a solution of ferrous sulphate by reaction of the sulphuric acid contained therein with iron sulphite, sulphuric acid being employed in amount sufficient to produce a concentrated solution of ferrous sulphate and said digestion being continued until substantially all of the sulphuric acid has reacted with components of the matte and there is produced a concentrated aqueous solution of ferrous sulphate in contact with solid nickel sulphide, and separating the ferrous sulphate solution from the solid nickel sulphide.

2. The method of treating matte containing sulphides of iron and nickel to produce separate iron-bearing and nickel-bearing products which comprises digesting the matte with an aqueous solution of sulphuric acid of such concentration as to be capable of forming a solution of ferrous sulphate by reaction of the sulphuric acid contained therein with iron sulphide, sulphuric acid being employed in amount sufficient to produce a concentrated solution of ferrous sulphate and said digestion being continued until substantially all of the sulphuric acid has reacted with components of the matte and there is produced a concentrated substantially acid-free and non-reactive aqueous solution of ferrous sulphate in contact with solid nickel sulphide, and separating the ferrous sulphate solution from the solid nickel sulphide.

3. The method of treating matte containing sulphides of iron and nickel to produce separate iron-bearing and nickel-bearing products which comprises digesting the matte with an aqueous solution of sulphuric acid of such concentration as to be capable of forming a solution of ferrous sulphate by reaction of the sulphuric acid contained therein with iron sulphide, sulphuric acid being employed in amount sufficient to produce a saturated solution of ferrous sulphate and said digestion being continued until substantially all of the sulphuric acid has reacted with components of the matte and there is produced a substantially saturated aqueous solution of ferrous sulphate in contact with solid nickel sulphide, and separating the ferrous sulphate solution from the solid nickel sulphide.

4. The method of treating matte containing sulphides of iron and nickel to produce separate iron-bearing and nickel-bearing products which comprises digesting the matte with an aqueous solution of sulphuric acid to produce an aqueous solution of ferrous sulphate with the evolution of hydrogen sulphide, the concentration of the acid solution employed and the time of digestion being such that a substantially saturated aqeous solution of ferrous sulphate is produced, whereby conversion of the nickel sulphide of the matte to a nickel compound soluble in the solution is inhibited, and separating the ferrous sulphate solution from the nickel sulphide.

5. The method of treating matte containing sulphides of iron and nickel to produce separate iron-bearing and nickel-bearing products which comprises digesting the matte with an aqueous solution of sulphuric acid to produce an aqueous solution of ferrous sulphate with the evolution of hydrogen sulphide, the amount and concentration of the acid solution employed and the time of digestion being such that a substantially acid-free, non-reactive and saturated solution of ferrous sulphate is produced, whereby the production of a nickel compound soluble in the solution is inhibited, and separating the ferrous sulphate solution from the nickel sulphide.

6. The method of treating matte containing sulphides of iron, copper and nickel to produce separate iron-bearing, copper-bearing and nickel-bearing products which comprises digesting the matte with an aqueous solution of sulphuric acid and forming a substantially saturated aqueous solution of ferrous sulphate in contact with a mixture of solid sulphides of copper and nickel, separating the ferrous sulphate solution from the mixture of copper and nickel sulphides, subjecting the mixture of copper and nickel sulphides to an oxidizing treatment to produce a mixture of copper and nickel oxides, digesting the mixture of copper and nickel oxides with an aqueous acid solution to form an aqueous acid solution of salts of copper and nickel, treating the solution thus formed with hydrogen sulphide to produce insoluble copper sulphide and form a substantially copper-free solution of nickel salt, and separating the nickel solution from the copper sulphide.

7. The method of treating matte containing sulphides of iron and cobalt to produce separate iron-bearing and cobalt-bearing products which comprises digesting the matte with an aqueous solution of sulphuric acid of such concentration as to be capable of forming a solution of ferrous sulphate by reaction of the sulphuric acid contained therein with iron sulphide, sulphuric acid being employed in amount sufficient to produce a concentrated solution of ferrous sulphate and said digestion being continued until substantially all of the sulphuric acid has reacted with components of the matte and there is produced a concentrated aqueous solution of ferrous sulphate in contact with solid cobalt sulphide, and separating the ferrous sulphate solution from the solid cobalt sulphide.

8. The method of treating matte containing sulphides of iron and cobalt to produce separate iron-bearing and cobalt-bearing products which comprises digesting the matte with an aqueous solution of sulphuric acid of such concentration as to be capable of forming a solution of ferrous sulphate by reaction of the sulphuric acid contained therein with iron sulphide, sulphuric acid being employed in amount sufficient to produce a concentrated solution of ferrous sulphate and said digestion being continued until substantially all of the sulphuric acid has reacted with components of the matte and there is produced a concentrated substantially acid-free and non-active aqueous solution of ferrous sulphate in contact with solid cobalt sulphide, and separating the ferrous sulphate solution from the solid cobalt sulphide.

9. The method of treating matte containing sulphides of iron, copper and nickel to produce separate iron-bearing, copper-bearing and nickel-bearing products which comprises digesting the matte with an aqueous solution of sulphuric acid and producing an aqueous solution of ferrous sulphate in contact with a mixture of solid copper and nickel sulphides, separating the ferrous sulphate solution from the mixture of copper and nickel sulphides, subjecting the mixture of copper and nickel sulphides to an oxidizing treatment to produce a mixture of copper and nickel oxides, digesting the mixture of copper and nickel oxides with an aqueous acid solution to form an aqueous acid solution of salts of copper and nickel, treating the solution thus formed with hydrogen sulphide to produce insoluble copper sulphide and form a substantially copper-free solution of nickel salt, and separating the nickel solution from the copper sulphide.

10. The method of treating matte containing sulphides of iron, copper and nickel to produce separate iron-bearing, copper-bearing and nickel-bearing products which comprises digesting the matte with an aqueous solution of sulphuric acid and producing an aqueous solution of ferrous sulphate in contact with a mixture of solid copper and nickel sulphides, separating the ferrous sulphate solution from the mixture of copper and nickel sulphides, subjecting the mixture of copper and nickel sulphides to an oxidizing treatment in the presence of sulphuric acid to produce a mixture of copper and nickel sulphates, forming an aqueous solution containing the copper and nickel sulphates, treating the resulting solution with hydrogen sulphide and forming a substantially copper-free solution of nickel sulphate in contact with solid copper sulphide, and separating the solution of nickel sulphide from the solid copper sulphide.

11. The method of treating ore containing sulphides of iron, copper and nickel to produce separate iron-bearing, copper-bearing and nickel-bearing products which comprises smelting the ore to produce matte containing sulphides of iron, copper and nickel, digesting the matte with an aqueous solution of sulphuric acid and forming an aqueous solution of ferrous sulphate in contact with a mixture of solid sulphides of copper and nickel, separating the ferrous sulphate solution from the mixture of copper and nickel sulphides, subjecting the mixture of copper and nickel sulphides to an oxidizing treatment to produce a mixture of copper and nickel oxides, digesting the mixture of copper and nickel oxides with an aqueous acid solution to form an aqueous acid solution of salts of copper and nickel, treating the solution thus formed with hydrogen sulphide to produce insoluble copper sulphide and form a substantially copper-free solution of nickel salt, and separating the nickel solution from the copper sulphide.

12. The method of treating ore containing sulphides of iron, copper and nickel to produce separate iron-bearing, copper-bearing and nickel-bearing products which comprises smelting the ore to produce matte containing sulphides of iron, copper and nickel, digesting the matte with an aqueous solution of sulphuric acid and forming an aqueous solution of ferrous sulphate in contact with a mixture of solid sulphides of copper and nickel, separating the ferrous sulphate solution from the mixture of copper and nickel sulphides, subjecting the mixture of copper and nickel sulphides to an oxidizing treatment in the presence of sulphuric acid, digesting the mixture of copper and nickel oxides with an aqueous acid solution to form an aqueous acid solution of salts of copper and nickel, treating the solution thus formed with hydrogen sulphide to produce insoluble copper sulphide and form a substantially copper-free solution of nickel salt, and separating the nickel solution from the copper sulphide.

13. The method of treating ore containing sulphides of iron, copper and nickel to produce separate iron-bearing, copper-bearing and nickel-bearing products which comprises smelting a charge comprising the ore, iron oxide-bearing material and carbonaceous material to produce matte containing sulphides of iron, copper and nickel, digesting the matte with an aqueous solution of sulphuric acid and forming an aqueous solution of ferrous sulphate in contact with a mixture of solid sulphides of copper and nickel, separating the ferrous sulphate solution from the mixture of copper and nickel sulphides, subjecting the mixture of copper and nickel sulphides to an oxidizing treatment to produce a mixture of copper and nickel oxides, digesting the mixture of copper and nickel oxides with an aqueous acid solution to form an aqueous acid solution of salts of copper and nickel, treating the solution thus formed with hydrogen sulphide to produce insoluble copper sulphide and form a substantially copper-free solution of nickel salt, and separating the nickel solution from the copper sulphide.

14. The method of treating ore containing sulphides of iron, copper and nickel to produce separate iron-bearing, copper-bearing and nickel-bearing products which comprises smelting a charge comprising the ore, iron oxide-bearing material and carbonaceous material to produce matte containing sulphides of iron, copper and nickel, digesting the matte with an aqueous solution of sulphuric acid to produce an aqueous solution of ferrous sulphate in contact with a mixture of solid copper and nickel sulphides, separating the ferrous sulphate solution from the mixture of copper and nickel sulphides, subjecting the mixture of copper and nickel sulphides to an oxidizing treatment in the presence of sulphuric acid to produce a mixture of copper and nickel sulphates, treating the mixture of copper and nickel sulphates with water to produce an aqueous solution containing copper and nickel sulphates, treating the solution thus formed with hydrogen sulphide to produce insoluble copper sulphide and form a substantially copper-free solution of nickel sulphate, and separating the nickel sulphate solution from the copper sulphide.

15. The method of treating matte containing sulphides of iron and one or more other elements of the group consisting of copper, nickel, cobalt, arsenic, tin, molybdenum, selenium, tellurium, vanadium and precious metals to obtain separate products containing iron and the one or more other elements which comprises digesting the matte at a temperature above 25° C. with an aqueous solution of sulphuric acid to form a solution of ferrous sulphate, the acid solution employed being of such concentration that a solution saturated with respect to ferrous sulphate can be produced by cooling the ferrous sulphate solution to 25° C. and the digestion being continued until substantially all of the sulphuric acid has reacted with the components of the matte and there is produced (1) an aqueous solution of ferrous sulphate substantially free of all elements other than iron originally present in the matte, (2) gaseous hydrogen sulphide containing the sulphur combined with iron in the matte and (3) a solid product containing substantially all of the balance of the sulphur of the matte and substantially all other elements contained in the matte, and separating the solution of ferrous sulphate from the solid product.

16. The method of treating matte containing sulphides of iron and one or more other elements of the group consisting of copper, nickel, cobalt, arsenic, tin, molybdenum, selenium, tellurium, vanadium and precious metals to obtain separate products containing iron and the one or more other elements which comprises digesting the matte with an aqueous solution of sulphuric acid of such concentration as to be capable of forming a solution of ferrous sulphate by reaction of the sulphuric acid contained therein with iron sulphide, said digestion being continued until substantially all of the sulphuric acid has reacted with components of the matte and there is produced (1) a substantially acid-free, non-reactive and saturated solution of ferrous sulphate substantially free of all elements other than iron originally present in the matte and saturated with respect to hydrogen sulphide, (2) gaseous hydrogen sulphide containing the sulphur combined with iron in the matte and (3) a solid product containing substantially all of the balance of the sulphur of the matte and substantially all other elements contained in the matte, and separating the solution of ferrous sulphate from the solid product.

17. The method of treating iron sulphide-bearing material containing gangue material and sulphides of one or more other elements which comprises smelting the iron sulphide-bearing material under such conditions as to produce molten slag containing the gangue material and molten, acid-soluble matte containing the iron and one or more other elements in sulphide forms, separating the slag and matte, converting the matte to a solid, finely divided condition, digesting the matte with an aqueous solution of sulphuric acid of such concentration as to be capable of forming a solution of ferrous sulphate by reaction of the sulphuric acid contained therein with iron sulphide, sulphuric acid being employed in amount sufficient to produce a concentrated solution of ferrous sulphate and said digestion being continued until substantially all of the sulphuric acid has reacted with components of the matte and there is produced (1) a substantially saturated solution of ferrous sulphate substantially free of all elements other than iron originally present in the matte, (2) gaseous hydrogen sulphide containing the sulphur combined with iron in the matte and (3) a solid product containing substantially all of the balance of the sulphur of the matte and substantially all other elements contained in the matte, and separating the solution of ferrous sulphate from the solid product.

18. The method of treating iron sulphide-bearing material containing gangue material and sulphides of one or more other elements which comprises smelting the iron sulphide-bearing material under such conditions as to produce molten slag containing the gangue material and molten, acid-soluble matte containing the iron and one or more other elements in sulphide forms, separating the slag and matte, converting the matte to a solid, finely divided condition, digesting the matte at a temperature above 25° C. with an aqueous solution of sulphuric acid to form a solution of ferrous sulphate, the acid solution being of such concentration that a solution saturated with respect to ferrous sulphate can be produced by cooling the ferrous sulphate solution to 25° C. and the digestion being continued until substantially all of the sulphuric acid has reacted with the components of the matte and there is produced (1) an aqueous solution of ferrous sulphate substantially free of all elements other than iron originally present in the matte, (2) gaseous hydrogen sulphide containing the sulphur combined with iron in the matte and (3) a solid product containing substantially all of the balance of the sulphur of the matte and substantially all other elements contained in the matte, and separating the solution of ferrous sulphate from the solid product.

19. The method of treating iron sulphide-bearing matreial containing gangue material and sulphides of one or more other elements which comprises smelting the iron sulphide-bearing material under such conditions as to produce molten slag containing the gangue material and molten, acid-soluble matte containing the iron and one or more other elements in sulphide forms, separating the slag and matte, converting the matte to a solid, finely divided condition, digesting the matte with an aqueous solution of sulphuric acid of such concentration as to be capable of forming a solution of ferrous sulphate by reaction of the sulphuric acid contained therein with iron sulphide, sulphuric acid being employed in amount sufficient to produce a concentrated solution of ferrous sulphate and said digestion being continued until substantially all of the sulphuric acid has reacted with components of the matte and there is produced (1) a substantially saturated solution of ferrous sulphate substantially free of all elements other than iron originally present in the matte, (2) gaseous hydrogen sulphide containing the sulphur combined with iron in the matte and (3) a solid product containing substantially all of the balance of the sulphur of the matte and substantially all other elements contained in the matte, and separating the solution of ferrous sulphate from the solid product.

MARVIN J. UDY.

REFERENCES CITED

The following references are of record in the file of this patent:

UNITED STATES PATENTS

| Number | Name | Date |
| --- | --- | --- |
| 78,001 | Monnier | May 19, 1868 |
| 763,478 | Gin | June 28, 1904 |
| 824,699 | Atkinson | July 3, 1906 |
| 981,451 | McKetchnie | Jan. 10, 1911 |
| 1,047,825 | McKetchnie | Dec. 17, 1912 |
| 1,101,115 | Borchers | June 23, 1914 |
| 1,333,688 | Sulmon et al. | Mar. 16, 1920 |
| 1,434,084 | Christensen | Oct. 31, 1922 |
| 1,565,353 | Estelle | Dec. 15, 1925 |
| 1,729,423 | Harshaw | Sept. 24, 1929 |
| 1,756,092 | Lathe | Apr. 29, 1930 |
| 1,857,494 | Carson | May 10, 1932 |

FOREIGN PATENTS

| Number | Country | Date |
| --- | --- | --- |
| 4,997 | Great Britain | Mar. 14, 1892 |
| 24,486 | Great Britain | Nov. 27, 1905 |

OTHER REFERENCES

A Treatise on Chemistry, by H. E. Roscoe and C. Shorlemmer, vol. 2, McMillan & Co. Ltd., London, 1923, pp. 1287, 1288.

Standard Method of Chemical Analysis, Scott, page 495, 4th ed., vol. I, 1917.